United States Patent Office 2,787,982
Patented Apr. 9, 1957

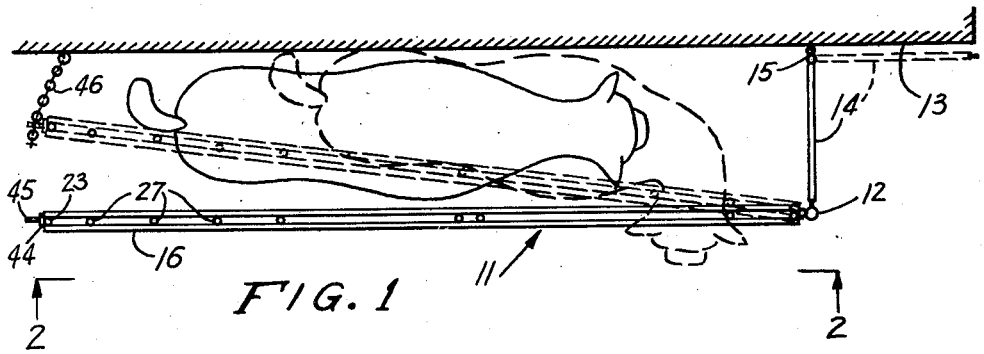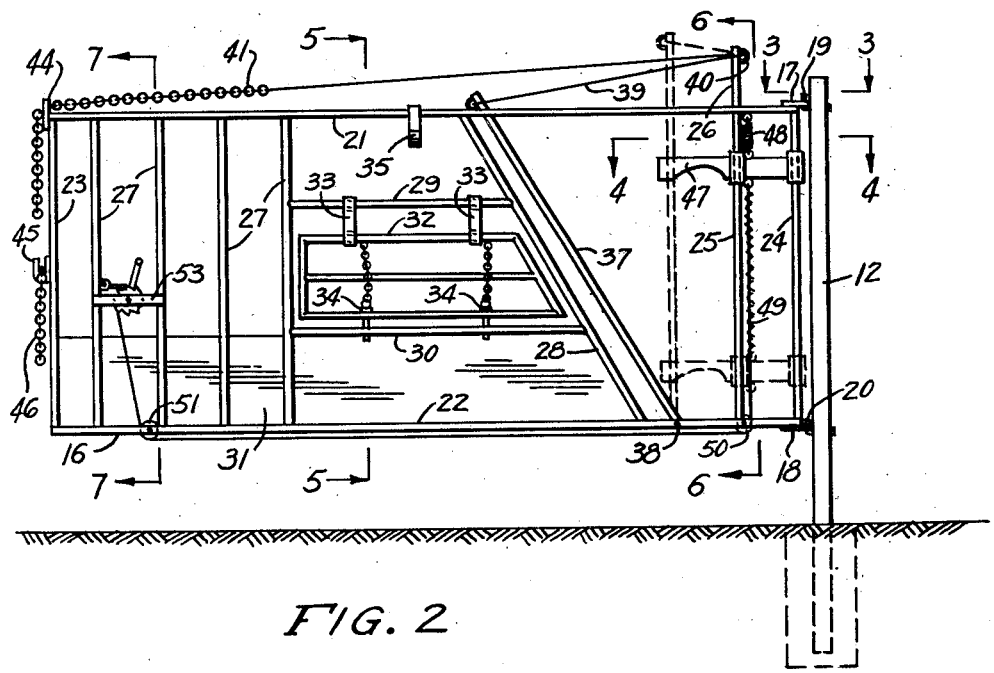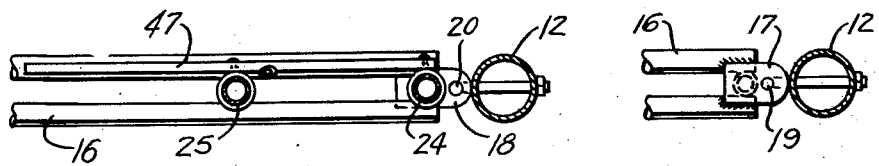

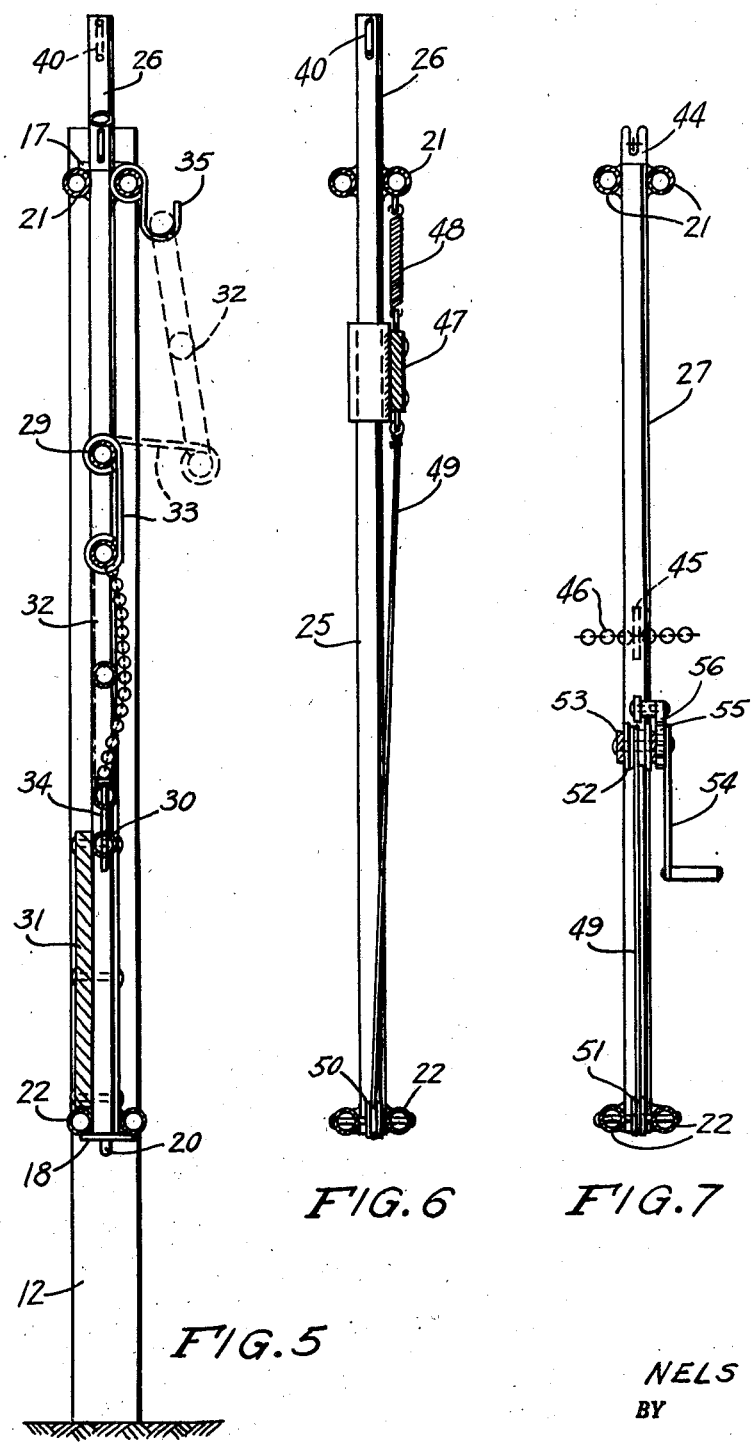

2,787,982
ANIMAL HOLDING DEVICE

Nels Clarence Cederberg, Longmont, Colo.

Application March 16, 1956, Serial No. 572,136

3 Claims. (Cl. 119—98)

This invention relates to animal catching and holding devices, and more particularly to an improved animal detention device for securing an animal in position for performing a required operation thereon, such as branding, dehorning, or the like.

A main object of the invention is to provide an improved animal detention device which is simple in construction, which is easy to install, and which is reliable in operation.

A further object of the invention is to provide an improved animal detention device which involves inexpensive parts, which is rugged in construction, which enables the user to readily catch and hold an animal for the purpose of vaccinating, branding, dehorning, or for any other close contact work required to be performed on the animal, and which is arranged so that it can be readily stored in an out-of-the-way position when not in use.

A still further object of the invention is to provide an improved animal detention device which makes it easy to catch and retain an animal in order to perform a required operation on the animal, which can be operated by a single person with complete safety, and which is so constructed that after the animal is caught therein, the animal is held in a position wherein it is prevented from making any undesired movement, whereby the operator may perform the required work on the animal with complete safety and with minimum effort.

Further objects and advantages of the invention will become apparent from the following description and claims, and from the accompanying drawings, wherein:

Figure 1 is a top view of an animal holding device constructed in accordance with the present invention, and shown installed on a vertical wall which is employed in conjunction with the holding device to retain the animal while an operation is being performed thereon.

Figure 2 is an elevationel view taken on the line 2—2 of Figure 1.

Figure 3 is an enlarged horizontal cross sectional view taken on the line 3—3 of Figure 2.

Figure 4 is an enlarged horizontal cross sectional view taken on the line 4—4 of Figure 2.

Figure 5 is an enlarged vertical cross sectional view taken on the line 5—5 of Figure 2.

Figure 6 is an enlarged vertical cross sectional view taken on the line 6—6 of Figure 2.

Figure 7 is an enlarged vertical cross sectional view taken on the line 7—7 of Figure 2.

Referring to the drawings, the improved animal holding device is designated generally at 11 and comprises a vertical post 12 which may be anchored in the ground or in the surface of a building in which the device is installed in any suitable manner so that it is rigidly secured in a vertical position. Preferably, the post 12 is installed adjacent to a vertical wall 13, so that the wall may be utilized in conjunction with the animal holding device in a manner presently to be described.

As shown in Figure 1, the post 12 is spaced a sufficient distance from the vertical wall 13 to allow an animal to pass between the post 12 and the wall 13 after the required operation has been performed thereon, and a gate 14 may be provided between the wall 13 and the post 12, hinged to the wall at 15, and provided with suitable latch means, not shown, whereby it may be temporarily secured to the post 12. When the animal is to be released, the gate 14 is opened, being then swung to its dotted line position, shown in Figure 1, to allow the animal to pass between post 12 and wall 13.

Designated at 16 is a vertical, generally rectangular frame which is hinged to the post 12 for horizontal swinging movement, as by the provision of hinge lugs 17 and 18 secured to the end of the frame at its top and bottom and engaged with hinge pins 19 and 20 provided on the post 12 and extending vertically through apertures provided in the hinge lugs 17 and 18.

As illustrated in the drawings, the frame 16 may comprise top and bottom horizontal bars 21 and 22 and vertical end bars 23 and 24. A vertical bar 25 is rigidily secured in the frame adjacent to but spaced from the end bar 24, the bar 25 projecting upwardly a short distance above the top bar 21, as shown at 26.

A plurality of vertical bars 27 are rigidly secured in the frame adjacent to and spaced from the end vertical bar 23, and an inclined bar 28 is secured in the frame between the innermost vertical bar 27 and the vertical bar 25, as shown in Figure 2, the inclined bar 28 being connected to the innermost vertical bar 27 by horizontal bars 29 and 30. Rigidly secured to the lower portion of the frame and extending between the lower portion of the inclined bar 28 and the end vertical bar 23 is a retaining board 31 of substantial height, for example, of a height sufficient to cover the area between the bottom bar 22 and the horizontal intermediate bar 30. A panel section 32 is provided in the space defined by the intermediate bars 29 and 30 and bounded by the innermost vertical bar 27 and the inclined bar 28, the panel element 32 being hingedly supported on the bar 29, as by hinge brackets 33, 33, so that the panel element 32 may be at times swung away from the plane of frame 16, the panel element being provided with locking means for securing the panel element in the plane of the frame, for example, the removable pins 34, 34 which are insertable through aligned openings in the lower bar of the panel element 32 and the subjacent horizontal bar 30. A supporting catch member 35 is secured to the intermediate portion of the top frame bar 21 above the panel element 32, said supporting catch member 35 being of any suitable shape, for example, being hook-shaped, as shown in Figure 5 and being supportingly engageable with the lower bar of the panel element 32 when said panel element is swung upwardly to its fully open position, shown in dotted view in Figure 5, to support the panel element in said open position.

Designated at 37 is a detention bar which is pivoted at its lower end to the lower frame bar 22 adjacent the vertical bar 25, as shown at 38, the detention bar 37 extending upwardly beyond the top frame bar 21 and being connected to the end of a cable 39 which extends through a guide loop 40 provided on the top end of the vertical bar 25 and then extends reversely toward the end portion of frame 16 opposite the hinged end thereof. A length of chain 41 is connected to the end of the cable 39, said chain being lockingly engageable with a U-shaped chain locking bracket 44, shown in Figure 7, whereby the cable 39 may be anchored at times, for example, with the detention bar 37 in its vertical position, shown in dotted view in Figure 2.

A similar U-shaped chain locking bracket 45 is provided on the intermediate portion of the frame bar 23, said bracket being adapted to lockingly engage a chain 46 secured to the wall 13, whereby the frame 16 may be at times locked in a detaining position adjacent the wall, as shown in dotted view in Figure 1, so as to clamp an animal to the wall for performing a required operation thereon.

Designated at 47 is a yoke member which is slidably engaged on the vertical bars 24 and 25 for vertical movement, the yoke member being yieldably supported in an elevated position by a coiled spring 48 connecting the intermediate portion of the yoke member to the top frame bar 21, as shown in Figure 6. A flexible cable 49 is connected to the intermediate portion of the yoke member 47 adjacent the vertical bar 25, said cable 49 extending downwardly and around pulleys 50 and 51 journaled on the lower frame bar 22. The cable 49 is secured to a reel 52 journaled on a horizontal bar 53 secured between the intermediate portions of a pair of vertical bars 27, 27, as shown in Figure 2, said reel being provided with the operating handle 54 and with the ratchet disc 55 which is engaged by a pawl 56, as shown in Figure 7, whereby the cable 49 may be at times locked with the yoke member 47 in a lowered position, as shown in dotted view in Figure 2. The pawl member 56 is pivoted to the adjacent vertical bar 27 and may be elevated manually to release the ratchet disc 55 when it is desired to release the yoke member 47.

In using the device, an animal is first led into the space between the frame 16 and the wall 13, and the animal is guided so that its head passes through the space beneath the yoke member 47. Under these conditions, the frame 16 may be spaced a substantial distance from the wall 13, whereby the animal inserts its head comfortably through the space beneath the yoke member 47. The detention bar 37 is then swung from the full line position thereof shown in Figure 2 to substantially the vertical position shown in dotted view in Figure 2 and the yoke member 47 is lowered, whereby the animal's neck is engaged and retained in the relatively constricted space defined between the detention bar 37, the adjacent bar 25, and between the yoke member 47 and the bottom bar 22. The detention bar 37 may be secured in its substantially vertical position by engaging the chain 41 with the chain-locking bracket 44, as above described, and similarly the yoke member 47 may be locked in its lowered position by winding up the cable 49 on the reel 52, employing the ratchet disc 55 to lock the reel against reverse rotation, as by means of the pivoted locking pawl 56. With the neck of the animal thus secured in the frame, the frame is moved closely adjacent to the wall 13, so that the animal is held against the wall and so that the animal's neck is turned in the manner shown in dotted view in Figure 1. The frame is locked in this position by means of the chain 46 and the cooperating chain locking bracket 45, whereby the animal is clamped against the wall with its neck in a turned position, as shown in Figure 1, thus rendering the animal helpless and firmly securing the animal so that a desired operation may be performed thereon. To provide access to the animal's body, the panel element 32 may be swung away from the plane of the frame, and may be temporarily locked in open position by engaging the lower bar of the panel element 32 with the hook-like bracket 35, as shown in dotted view in Figure 5.

After the operation is completed, the chain 46 may be released, and the gate 14 may be opened, the animal being allowed to remove its head from the frame by releasing the chain 41 and by lifting the locking pawl 56, allowing cables 39 and 49 to be released, and thus freeing the animal. The animal may leave the device by passing through the space between post element 12 and wall 13, with the gate 14 in its opened position. The next animal may then be introduced between the frame 16 and the wall 13 for performing the required operation thereon.

While a specific embodiment of an improved animal holding device has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An animal holding device of the character described comprising vertical support means, a vertical frame hinged to said support means for horizontal swinging movement, a detention element pivotally secured to the lower portion of said frame adjacent the hinged vertical edge thereof and extending upwardly beyond the top edge of said frame, vertical guide means positioned between said detention element and said hinged vertical edge and rigidly mounted on said frame, a first flexible control member having the intermediate portion slidably supported in said guide means and having one end secured to the top end portion of said detention element and having the other end detachably secured to the part of said frame remote from said hinged vertical edge, a horizontal yoke member slidably mounted on said guide means and extending substantially over the pivoted end of said detention element, means yieldably supporting said yoke member in elevated position on the frame, and a second flexible control member operatively connected to a reeling mechanism carried by a part of said frame remote from said hinged vertical edge and having one end connected to said yoke member.

2. An animal holding device of the character described comprising vertical support means, a vertical frame hinged to said support means for horizontal swinging movement, a detention element pivotally secured to the lower portion of said frame adjacent the hinged vertical edge thereof and extending upwardly beyond the top edge of said frame, vertical guide means positioned between said detention element and said hinged vertical edge and rigidly mounted on said frame, a first flexible control member having the intermediate portion slidably supported in said guide means and having one end secured to the top end portion of said detention element and having the other end detachably secured to the part of said frame remote from said hinged vertical edge, a horizontal yoke member slidably mounted on said guide means for vertical movement and extending substantially over the pivoted end of said detention element, means yieldably supporting said yoke member in elevated position on the frame, a second flexible control member operatively connected to a reeling mechanism carried by a part of said frame remote from said hinged vertical edge and having one end connected to said yoke member, and a panel element hingedly mounted in the intermediate portion of the frame, affording access to the body of an animal held in said frame when swung away from the plane of the frame.

3. An animal holding device of the character described comprising vertical support means, a vertical frame hinged to said support means for horizontal swinging movement, a detention bar pivotally secured to the lower margin of the frame adjacent the hinged vertical edge thereof and extending upwardly beyond the top edge of said frame, vertical guide means positioned between said detention element and said hinged vertical edge and rigidly mounted on said frame, a first flexible control member having the intermediate portion slidably supported in said guide means and having one end secured to the top end portion of said detention element and having the other end detachably secured to a part of said frame remote from said hinged vertical edge, a horizontal yoke member slidably mounted on said guide means for vertical movement and extending substantially over the pivoted end of said detention bar, means yieldably supporting said yoke member in elevated position on the frame, a second flexible control member operatively connected to a reeling mechanism carried by a part of said frame remote from said hinged vertical edge and having one end connected to said yoke member, and a panel element hingedly mounted at its top edge in the intermediate portion of the frame, affording access to the body of an animal held in said frame when swung away from the plane of the frame.

References Cited in the file of this patent

UNITED STATES PATENTS

| | | |
|---|---|---|
| 2,576,654 | Thorson | Nov. 27, 1951 |
| 2,692,577 | Thomas | Oct. 26, 1954 |